(12) United States Patent
Sawal et al.

(10) Patent No.: US 10,142,028 B2
(45) Date of Patent: Nov. 27, 2018

(54) SIGNALING METHOD FOR LEVERAGING POWER ATTENUATION IN A MANDREL-WRAPPED OPTICAL FIBER

(71) Applicant: Dell Products L.P., Round Rock, TX (US)

(72) Inventors: Vinay Sawal, Fremont, CA (US); Marimuthu Sakthivel, Santa Clara, CA (US); Shubhang Chaudhary, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/196,813

(22) Filed: Jun. 29, 2016

(65) Prior Publication Data

US 2018/0006718 A1 Jan. 4, 2018

(51) Int. Cl.
  *H04B 10/516* (2013.01)
  *H04B 10/54* (2013.01)
  *G02B 6/14* (2006.01)
  *H04B 10/079* (2013.01)

(52) U.S. Cl.
  CPC ............ *H04B 10/516* (2013.01); *G02B 6/14* (2013.01); *H04B 10/07955* (2013.01); *H04B 10/54* (2013.01)

(58) Field of Classification Search
  CPC .................... H04B 10/516; G01M 11/30
  See application file for complete search history.

(56) References Cited

U.S. PATENT DOCUMENTS

| 5,029,978 | A | * | 7/1991 | Curtis | G02F 1/0134 |
| | | | | | 385/3 |
| 5,202,746 | A | * | 4/1993 | Sentsui | H04B 10/25 |
| | | | | | 250/227.17 |
| 5,329,348 | A | * | 7/1994 | Nimura | G02B 6/447 |
| | | | | | 356/73.1 |
| 6,346,985 | B1 | * | 2/2002 | Hall | G01D 5/35303 |
| | | | | | 356/477 |
| 2003/0052258 | A1 | * | 3/2003 | Russell | G02B 6/447 |
| | | | | | 250/227.17 |
| 2005/0041902 | A1 | * | 2/2005 | Frigo | G01M 11/088 |
| | | | | | 385/1 |
| 2005/0174563 | A1 | * | 8/2005 | Evans | H04B 10/071 |
| | | | | | 356/73.1 |

* cited by examiner

*Primary Examiner* — David Payne
*Assistant Examiner* — Casey Kretzer
(74) *Attorney, Agent, or Firm* — Jackson Walker L.L.P.

(57) ABSTRACT

A method includes monitoring a parameter of an optical signal transmitted between two endpoints via an optical fiber. The optical fiber may be manipulated to modulate the parameter without disconnecting either endpoint of the optical fiber. Data in accordance with the modulation of the monitored parameter may be identified. A portion of the optical fiber may be wrapped around a high order mode filter (HOMF) that includes a grooved cylinder or mandrel suitable for wrapping the optical fiber. The monitored parameter may include a received power parameter. The HOMF may be a variable diameter HOMF that can be transitioned between a wrapped or attenuating diameter and an unwrapped or non-attenuating diameter in accordance with a data pattern. The wrapped and unwrapped diameters may be defined relative to a threshold diameter, above which the monitored parameter may be independent of the diameter.

12 Claims, 5 Drawing Sheets

SIGNALING METHOD FOR LEVERAGING POWER ATTENUATION IN A MANDREL-WRAPPED OPTICAL FIBER

TECHNICAL FIELD

The present disclosure generally relates to information handling networks and, more particular, shared memory switches for implementing information handling networks.

BACKGROUND

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an IHS may include a variety of hardware and software components that may be configured to process, store, and communicate information and may include one or more computer systems, data storage systems, and networking systems.

An IHS can be configured in several different configurations ranging from a single, stand-alone computer system to a distributed, multi-device computer system, to a networked computer system with remote or cloud storage systems.

An information handling system can be a part of a data center that includes a plurality of information handling systems interconnected via a plurality of cables of one or more cable types (e.g., twisted pair copper, optical fiber, etc.). Those of ordinary skill in the field of data centers and data center infrastructure will appreciate that the number of cables employed in a large data center is generally very large. In addition, efficient and accurate cable management is a critical requirement for proper functioning and maintenance of a commercial or industrial data center, where availability expectations routinely exceed 99.5%. This is particularly true when equipment is upgraded to add capacity and bandwidth.

A fiber optic cable presents unique cable management challenges in terms of identifying and tracing a cable non-intrusively because conventional optical fiber testers require the cable to be unplugged from the source and connected to the tester. Nevertheless, anecdotal data suggests that the mis-configuration of optical cables, e.g., by plugging one or both of the cable's endpoints, may occur fairly frequently.

Identifying an incorrectly routed optical fiber by tracing the cable to its endpoints cannot be done with a conventional optical tester without unplugging one or both of the endpoints. In addition, speculatively unplugging one or more cables in an attempt to trace or identify the cable or its endpoints is a less than ideal approach. A similar challenge arises when maintenance personnel generate and/or update "cable tags," tags attached to a cable that identify the cable to which the tag is affixed. When unplugging the cables is not an option, they usually trace the cables to identify the endpoints and update the corresponding tags.

SUMMARY

In accordance with disclosed subject matter, issues associated with non-intrusively tracing or otherwise identifying a particular cable in a data center or other similar environment are addressed.

In accordance with a disclosed method, a parameter of an optical signal transmitted between two endpoints via an optical fiber is monitored. The physical position and orientation of the optical fiber may be manipulated to modulate or otherwise vary the monitored parameter without disconnecting either endpoint of the optical fiber. Data in accordance with the modulation of the monitored parameter may be identified.

Manipulating the optical fiber may include modifying a position or orientation of at least some portion of the optical fiber without disconnecting the optical fiber from either of the two endpoints. A portion of the optical fiber may be wrapped around a high order mode filter (HOMF). The HOMF may include a grooved cylinder or mandrel suitable for wrapping the optical fiber around.

The optical signal may be transmitted from a first endpoint to the second endpoint and the monitored parameter may include a received power parameter indicative of an average power of the optical signal as received at the second endpoint. The HOMF may be a variable diameter HOMF and manipulating the optical fiber may include varying the HOMF between a smaller, wrapped diameter and a larger, unwrapped diameter in accordance with a data pattern. e.g., the wrapped diameter corresponds to "1" and the unwrapped diameter corresponds to "0".

The wrapped diameter and the unwrapped diameter may be defined relative to a threshold diameter, above which the monitored parameter may show little, if any, dependence on the HOMF diameter. Similarly, the optical fiber's mode volume and signal power is substantially independent of HOMF diameter for HOMF diameters greater than the threshold diameter.

The wrapped portion of the optical fiber may include five turns of the HOMF or some other number of turns. The received power parameter corresponding to the unwrapped diameter of the HOMF may exceed the received power parameter corresponding to the wrapped diameter by a value in a range of approximately 5% to 10%.

In at least some embodiments, a ratio of the unwrapped diameter to the wrapped diameter is in a range of approximately 1.1 to 1.5 and the optical fiber comprises a 62.5 micron multimode fiber core within a 3 mm jacket.

The data pattern may include a sequence of binary data points and manipulating the optical fiber may include, for each of the binary data points, maintaining the HOMF diameter at either the wrapped diameter or the unwrapped diameter, in accordance with the particular data point, for a minimum duration or pulse width. If a sensor at one of the endpoints detects the monitored parameter within a particular range for the minimum duration, a valid 1 or 0 is recognized.

The minimum pulse width may be on the order of 1 to 10 seconds. In at least one embodiment, the binary data points are processed and signaled at a rate of approximately 0.2 Hz.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale. For example, the dimensions of some of the elements may be exaggerated relative to other elements. Embodiments incorporating teachings of the present disclosure are shown and described with respect to the figures presented herein, in which.

DETAILED DESCRIPTION

In the following detailed description, specific exemplary embodiments in which disclosed subject matter may be practiced are described in sufficient detail to enable those skilled in the art to practice the disclosed embodiments. For example, details such as specific method orders, structures, elements, and connections have been presented herein. However, it is to be understood that the specific details presented need not be utilized to practice embodiments of disclosed subject matter. It is also to be understood that other embodiments may be utilized and that logical, architectural, programmatic, mechanical, electrical and other changes may be made within the scope of the disclosed subject matter. The following detailed description is, therefore, not to be taken as limiting the scope of the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features may be described which may be exhibited by some embodiments and not by others. Similarly, various requirements may be described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

Figure 1:
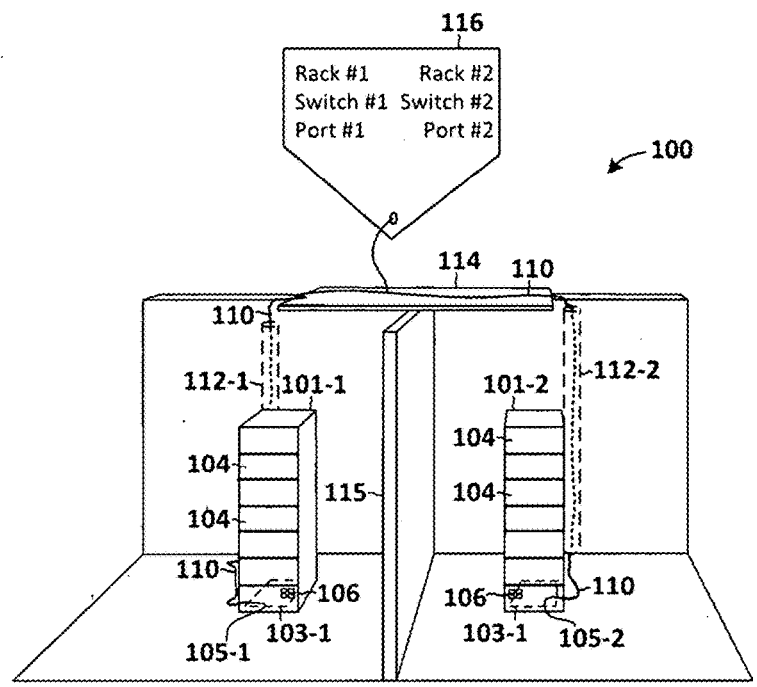
FIG. 1 illustrates two information handling system racks and an optical fiber connecting an information handling system in one of the racks to an information handling system in the other rack.

FIG. 1 illustrates elements of an information handling system data center 100 in which an optical fiber 110 connects a first rack server, or another type of information handling resource 103-1, in a drawer 104 of a first information handling system rack 101-1 to a second rack server or other type of information handling resource 103-2 of a second information handling system rack 101-2.

The drawers 104 of information handling system rack 101 may each include one or more information handling system resources 103. The drawers 104 illustrated in FIG. 1 include light emitting diodes 106 to indicate status and/or data traffic activity of different information handling resources 103 and/or communication ports (not explicitly shown).

The optical fiber 110 of FIG. 1 is shown traversing a path from a first endpoint 105-1 at its connection with first information handling resource 103-1, through a first cable conduit 112-1, a cable tray 114 that extends over or through a wall 115, and a second cable conduit 112-2 to a second endpoint 105-2 at its connection with second information handling resource 103-2. This path, which is not unusual for cables in a data center 100 of any appreciable size, suggests the potential difficulty of tracing one of a large number of cables between its two endpoints or determining the endpoints of a particular cable selected at a midpoint. FIG. 1 illustrates a cable tag 116, which is a physical tag tied or otherwise affixed to a midpoint of optical fiber 110 and includes a printed or handwritten identification of its endpoints, specified in terms of rack, drawer, switch, port, etc. The endpoint identification that cable tag 116 provides may greatly improve the efficiency with which a maintenance or field technician can perform a particular cabling task. Determining accurate endpoint information for a cable tag 116, however, is generally laborious and time consuming for the very reasons that make cable tags 116 useful, i.e., the difficulty of tracing one of many cables, often identical or similar in appearance to other cables, between endpoints that may be located in different rooms over a path that may include opaque and/or hidden conduits and cable trays that render a visual trace of a cable extremely difficult.

Figure 2:
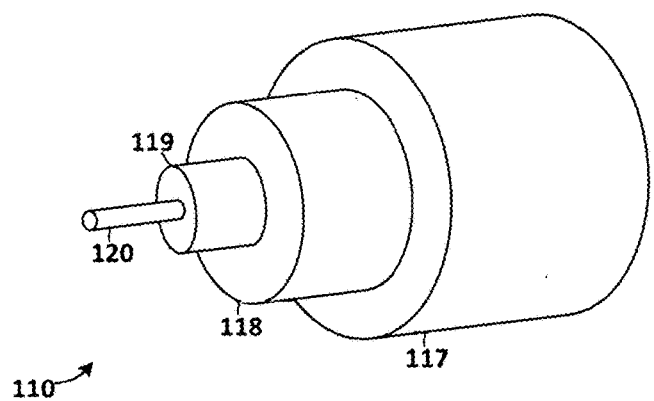
FIG. 2 illustrates an optical fiber.

FIG. 2 illustrates physical elements of a fiber optic cable 110. The fiber optic cable 110 illustrated in FIG. 2 includes a glass or translucent plastic fiber core 120, a cladding 119 surrounding fiber core 120, a buffer 118 surrounding cladding 119, and a jacket 117 surrounding buffer 118. In multimode embodiments of data center 100, example diameters of the fiber optic elements illustrated in FIG. 2 include 50 and 62.5 µm diameters for fiber core 120, a 125 µm outer diameter for cladding 119, a 250 µm outer diameter for buffer 118, and an outer diameter of 300 µm or more for jacket 117. Diameters for the illustrated elements of optical fiber 110 may differ in other embodiments. Some embodiments of optical fiber 110 may omit cladding 119 and/or omit jacket 117 while some embodiments may include multiple concentric buffers 118, e.g., primary and second buffers.

Multimode embodiments of optical fiber 110 may exhibit shape-dependent characteristics. More specifically, optical fiber 110 may exhibit optical and/or data transmission properties that vary when an orientation, arrangement, or configuration of the optical fiber 110 includes portions that are bent or curved. As an example, wrapping a portion of a multimode optical fiber around a cylindrical volume, alternatively referred to herein as a mandrel or HOMF, may attenuate a power of the signal transmitted through the fiber core due to a dispersion of higher order modes occurring in the wrapped portion of the optical fiber. The relationship between an optical signal parameter and the curvature of the optical fiber may be non-linear.

Anecdotal evidence suggests that a multimode optical fiber may transmit data equally well under two different physical configurations, one of which attenuates the signal power or another parameter of the optical signal. The two physical configurations may include a first configuration that encompasses a straight line configuration as well as curved or non-straight line configurations that produce little or no attenuation of optical signal power or another parameter of interest. The second configuration may include configurations in which a curvature of at least a portion of the optical cable is sufficient to achieve an observable and statistically significant attenuation of the parameter of interest while producing no or substantially no degradation of maximum data rate, bit error rate, or similar performance parameters.

The first and second configurations of the optical fiber may both include curved or wrapped portions. As a non-limiting example, a multimode optical fiber that includes a portion wrapped around a cylindrical volume may exhibit little or no appreciable attenuation of signal power or another parameter of interest for cylinder diameters exceeding some specific threshold. Advantageously, the difference between a non-attenuating diameter of the cylindrical volume and an attenuating diameter may be sufficiently small to make feasible a mechanized and/or automated control of the parameter of interest to implement a signaling technique that leverages the attenuating and shape-dependent characteristics of the optical fiber.

By controllably modulating the curvature of an optical fiber, resulting modulations of the parameter of interest can be detected at one or both of the optical fiber endpoints. If the curvature of the optical fiber is controllably modulated between two distinct curvatures, one of which is attenuating and one of which is non-attenuating, the parameter of interest may be digitized, i.e., represented in either of two particular states or values. In this manner, the optical fiber may be physically manipulated to convey out-of-band binary data, between the two endpoints.

Beneficially, the manipulation required to achieve the desired modulation may be performed without disconnecting the optical fiber from its endpoints. Accordingly, a randomly selected optical fiber can be manipulated to transmit a signal that can be optically or electrically observed at the endpoints, thereby automatically associating accurate endpoint data with the selected optical fiber.

Figure 3:
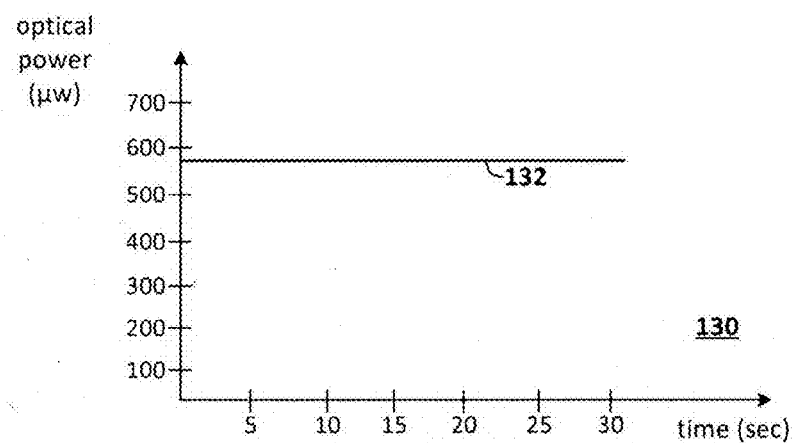
FIG. 3 illustrates a first plot of an optical signal parameter as a function of time.

FIG. 3 illustrates a plot 130 of a parameter of interest, associated with an optical signal transmitted via an optical fiber, as a function of time. The plot 130 corresponds to an interval during which the configuration of the applicable optical fiber was not altered or not altered sufficiently to attenuate the monitored parameter. For the plot 130 illustrated in FIG. 3, the monitored parameter is the signal power of the optical signal as received at a receiving endpoint. The plot line 132 illustrates that the received power is substantially independent of the transmitted data, varying by approximately 0.5% or less throughout the plotted interval of time, which is roughly 25 to 30 seconds as plotted in FIG. 3. The plot line 132 of FIG. 3 indicates a received signal power of slightly less than 600 microwatts, which may be used at the value associated with a first of two binary states of the received power.

Figure 4A:
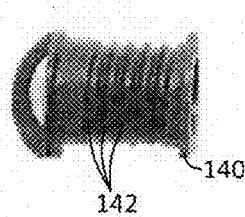
FIG. 4A illustrates an HOMF.

Before considering received power characteristics of an optical fiber that is manipulated in a controlled and intended manner to attenuate the parameter of interest, FIG. 4A illustrates a side elevation view of a mandrel 140 that may serve as the cylindrical volume around which an optical fiber may be wrapped to achieve a desired attenuation of the parameter of interest. The mandrel 140 illustrated in FIG. 4A includes a threaded groove pattern 142 that facilitates a mandrel wrapping process in which an optical fiber is wrapped around the mandrel 140, using the threaded groove pattern as a guide to minimize overlap and control the number of windings included in the wrapped portion. The threaded groove pattern 142 of the mandrel 140 illustrated in FIG. 4A is configured to accommodate an optical fiber 110 and to create a wrapped portion of the optical fiber that circumnavigates the mandrel roughly five times. The diameter of mandrel 140 is less than a threshold diameter, which may be a function of the optical core diameter as well as one or more of various other factors including the dimensions and compositions of all of the various elements of the optical fiber 110 (see FIG. 2). The mandrel 140 may have a particular diameter intended for use in conjunction with a particular optical fiber configuration. In such cases, the mandrel diameter is designed to be less than a threshold diameter, which may be a function of the optical fiber configuration. A minimum diameter of the mandrel may be specified by an optical fiber standard to prevent physical breakdown of the optical fiber 110.

In at least one embodiment, the mandrel diameter is selected to satisfy two objectives. The mandrel diameter may be chosen to achieve a particular attenuation of the parameter of interest. In the case of optical signal power as the parameter of interest, the mandrel diameter may be chosen to achieve a statistically significant and observable attenuation without impacting data transmission performance of the optical fiber 110.

In at least one embodiment, a mandrel diameter associated with an optical signal power attenuation of approximately 5 to 10% may be selected. In the non-limiting example of a 62.5/125 multimode fiber with a 3 mm jacket, i.e., a multimode fiber having a fiber core diameter of 62.5 microns and a 125 micron cladding outer diameter, wrapping the optical fiber around a 17 mm mandrel five times may produce a power attenuation of approximately 6% for a signal with a nominal power of roughly 600 microwatts. The power attenuation achieved with any particular mandrel diameter may be influenced by one or more other parameters and other embodiments may call for different mandrel diameters.

Figure 4B:
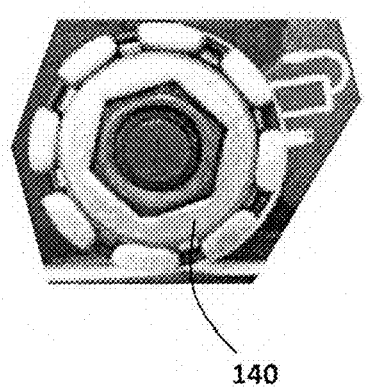
FIG. 4B illustrates a second HOMF.

FIG. 4B illustrates a variable diameter mandrel 140 that may be controllably transitioned between at least two different states corresponding to two different mandrel diameters. In some embodiments, the variable diameter mandrel may support two or more of diameter configurations that are stable. In some embodiments, the variable diameter mandrel may be operable with substantially any diameter with a particular range between a mandrel minimum diameter and a mandrel maximum diameter. The variable diameter mandrel may be configured to adjust the mandrel diameter, electrically, mechanically, or a combination of both. In at least one embodiment, the variable diameter mandrel 140 of FIG. 4B includes an embedded controller that supports a serial communication interface and includes control resources to control the diameter in accordance with one or more messages communicated to and from the variable diameter mandrel via the serial communication interface.

Figure 5:
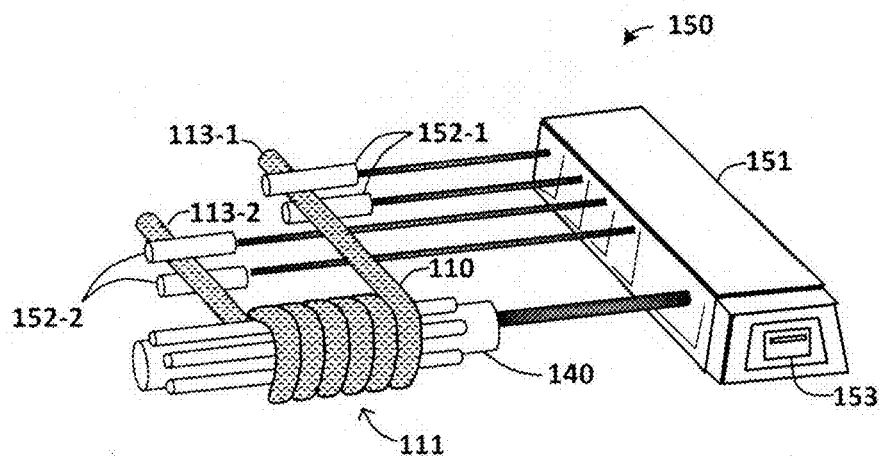
FIG. 5 illustrates an apparatus for manipulating a diameter of a wrapped portion of an optical fiber to modulate or attenuate a power of an optical signal transmitted via the optical fiber.

FIG. 5 illustrates mandrel control assembly 150 including the variable diameter mandrel 140 and two pairs of fiber control rollers 152-1 and 152-2 coupled to a controller 151 that includes a universal serial bus (USB) connector 153. In at least one embodiment, controller 151 includes an embedded controller and firmware, i.e., program instructions executable by the embedded controller, stored in flash memory or another non-volatile storage resource. The controller's firmware may include a self-sufficient module for controlling the variable diameter mandrel 140 and the fiber control roller pairs 152 to adjust the mandrel diameter among two or more particular values of mandrel diameters.

Controller 151 may further support a communication protocol with an information handling system (not shown) coupled to controller 151 via USB interface 153 or any of a number of serial communication protocols. The amount and/or rate of information exchanged between the information handling system and controller 151 may be sufficiently low to permit the use of lower bandwidth serial communication protocols including, as an example, I2C.

FIG. 5 further illustrates an optical fiber 110 including a wrapped portion 111 comprising a portion of optical fiber 110 wrapped around variable diameter mandrel 140. The fiber control roller pairs 152-1 and 152-2 respectively engage incoming and outgoing portions 113-1 and 113-2 of optical fiber 110 to manage optical fiber slack and tension whenever controller 151 changes the diameter of variable diameter mandrel 140.

Diameter control request messages may be generated by the information handling system as part of a cable management application or program to monitor optical signal power or another parameter of interest while manipulating the mandrel diameter to generate a modulated out-of-band signal in accordance with diameter-based modulations of the signal power. In at least one embodiment, the cable management application may simultaneously monitor the transmitted power of a group of endpoints, e.g., all endpoints of a rack, a rack drawer, and so forth, to determine which endpoint corresponds to the wrapped cable.

The controller 151 may include a WiFi or other wireless communication interface and the cable management application may execute on or communicate with a mobile information handling system including, as non-limiting examples, a laptop, smart phone, tablet, or other suitable wireless information handling system. In these embodiments, the cable management application may determine which endpoint senses an optical fiber signal exhibiting a modulating signal power and communicate the endpoint information to the mobile information handling system. In this manner, a technician armed with a mobile information handling system may mandrel wrap a randomly selected optical fiber with the mandrel control assembly 150, initiate execution of the cable management application to control the mandrel diameter as desired, and receive the endpoint information for the optical fiber via the mobile information handling system. In this manner, cable tag information can be generated and verified quickly and accurately.

Figure 6:
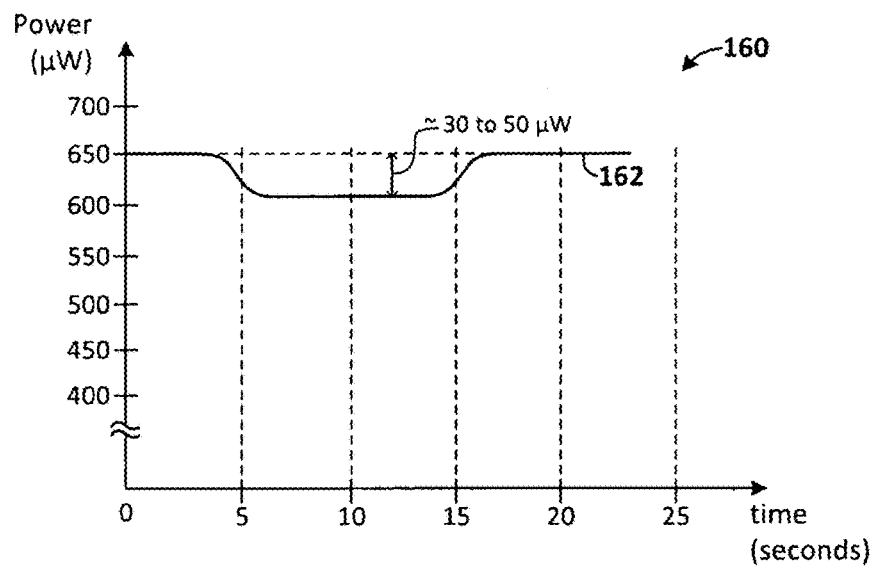
FIG. 6 illustrates a second plot of the optical signal parameter as a function of time while manipulating the optical fiber with the apparatus of FIG. 5.

FIG. 6 illustrates a plot 160 of a monitored parameter of an optical signal transmitted via optical fiber 110 as the optical fiber is manipulated as described in the preceding description. In the plot 160 illustrated in FIG. 6, mandrel diameter has been controlled to oscillate between two diameters at a prescribed rate. The plot line 162 illustrates the monitored parameter, which is the received power of the applicable optical signal oscillating between two values of power differentiated by roughly 30-50 microwatts.

The plot line 162 may be representative of an embodiment in which the optical fiber 110 has a 62.5 micron fiber core within a 3 mm optical fiber jacket and the variable diameter mandrel oscillates between a non-attenuating diameter of approximately 22 mm and an attenuating diameter of approximately 17 mm. The plot line 162 indicates that the signal power is roughly equal to the signal power of the straight line optical fiber plotted in FIG. 3 when the non-attenuating mandrel diameter is operative. Plot line 162 further illustrates a power attenuation of roughly 30 to 50 microwatts, which is roughly 5% to 9% of the non-attenuated power.

Accordingly, FIG. 6 illustrates an embodiment in which a decrease of roughly 23% in mandrel diameter, from 22 mm to 17 mm, produces a decrease of roughly 5% to 9% in average power. Analogous power attenuations may be observed in configurations that employ 50/125 optical fiber, i.e., 50 micron optical core diameter, using similar or different values of attenuating and non-attenuating mandrel diameters. As indicated previously, the power attenuation is not associated with any corresponding drop in data transmission rates or bit error rates. Accordingly, cable management techniques disclosed herein may be performed while user data is being transmitted via the optical fibers being monitored.

Figure 7:
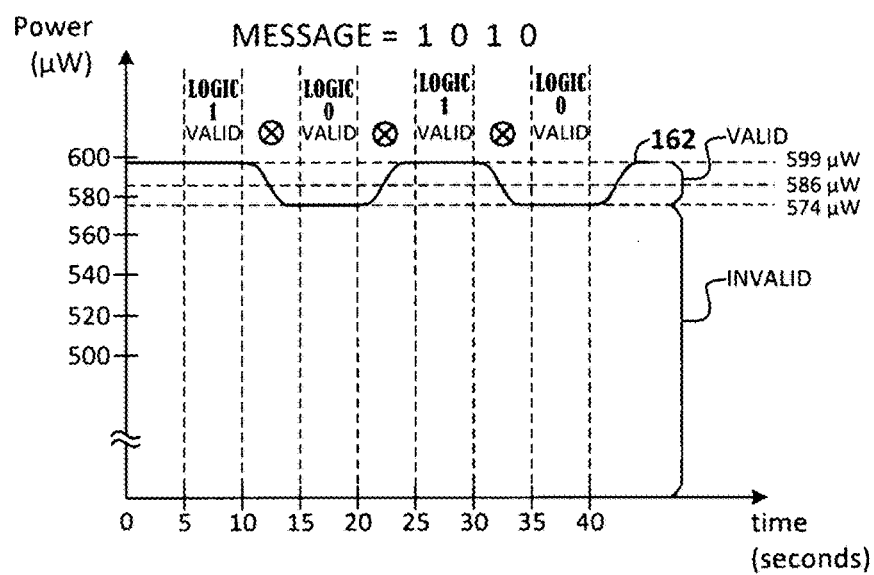
FIG. 7 illustrates binary data extracted from the plot of FIG. 6 in accordance with a signaling protocol.

FIG. 7 conveys an interpretation of the modulated plot line 162 of FIG. 6 according to a cable management signal protocol. As illustrated in FIG. 7, a cable management signaling protocol may define a first range of optical signal power as a valid range for a binary 0 and a second range of optical signal power for a valid range for a binary 1. FIG. 7 further illustrates that a valid binary 1 is recognized when the optical signal power remains in the second range of optical signal power for a particular interval of time. The interval of time illustrated in FIG. 7 is approximately 5 seconds, but other embodiments may employ shorter or longer intervals. FIG. 7 similarly illustrates a valid 0 occurring when the optical signal power remains within the first valid range for the particular interval of time.

The optical fiber 110 may be coupled to an optical cable interface (not depicted) at each of its endpoints. The optical cable interface may include one or more sensors to measure or monitor one or more parameters of the optical signal. The sensors may include an optical signal power sensor that samples the power of the optical fiber from time to time, e.g., at 1 Hz, 2 Hz, or the like. Optical signal power sensors may include one or more photodiodes selected for their responsiveness in the applicable wavelengths. A valid 1 or 0 may be recognized when each of the readings of the monitored parameter remain in one of the two valid ranges for the minimum duration. Although FIG. 7 suggests that the minimum duration for a valid binary 1 and a valid binary 2 are the same, other embodiments may use different durations for valid 1s and 0s.

FIG. 7 illustrates the optical fiber generating a binary data signal including the binary message 1-0-1-0. The transmission rate is approximately 1 bit/10 seconds after accounting for the approximately 5 second transitions of the plot line 162 between valid intervals of binary data. The message generated in accordance with disclosed cable management techniques may comply with standardized messages and message protocols.

For example, a messaging protocol may define a standard preamble of two or more binary digits to identify protocol-compliant messages. In this embodiment, the cable management application may produce endpoint information only upon observing a power modulation sequence in compliance with the standardized preamble. As another example, the cable management application may enable a technician to transmit a message indicating that the applicable cable is about to be disconnected. If an endpoint detecting such a message is transmitting data, the endpoint may initiate responsive action including, as examples, requesting the technician not to disconnect the optical fiber, rerouting data traffic, etc. Still other embodiments may support different messages for other purposes.

Figure 8:
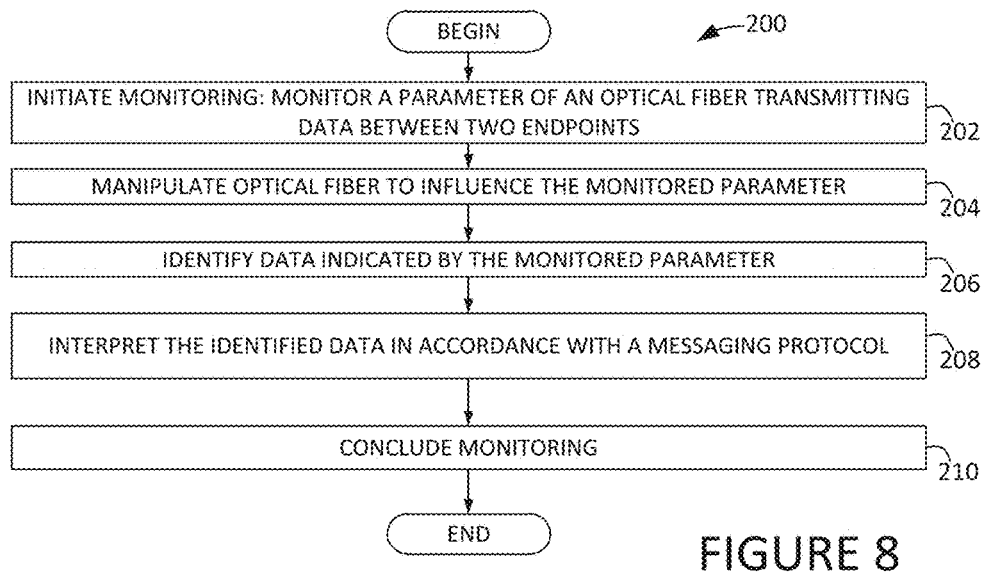
FIG. 8 illustrates a flow diagram of an optical fiber signaling process.

FIG. 8 illustrates a flow diagram of a cable management application 200. The cable management application 200 may be executed entirely or partially by an embedded controller in the mandrel diameter control assembly 150 of FIG. 5 or by a general purpose central processing unit of an information handling system coupled to the mandrel diameter control assembly. Similarly, a mobile information handling system in wireless communication with the mandrel diameter control assembly 150 may perform all or portions of method 200.

The method 200 illustrated in FIG. 8 includes initiating (block 202) the monitoring of one or more optical signal parameters of interest for an optical signal transmitting data between two endpoints via a corresponding optical fiber. While monitoring the parameter(s) of interest, the position, configuration, and/or orientation of at least a portion of the optical fiber is manipulated (block 204) to attenuate, modulate, or otherwise influence the parameter(s) of interest. As described in the preceding paragraphs, the parameter of interest may be or include the optical signal power and manipulating the optical fiber may include mandrel wrapping the optical fiber and subsequently controlling a diameter of the mandrel in a time-synchronized manner to produce a desired modulation of the parameter of interest.

A sensor or other resource at an endpoint of the optical fiber may sense the parameter of interest and, in conjunction with a cable management application that supports a particular messaging protocol, identify (block 206) data indicated by the monitored parameter. The identification of data illustrated in FIG. 7 is an example.

The method 200 illustrated in FIG. 8 further includes interpreting (block 208) the data identified in block 206. Interpreting data may be achieved in conjunction with the messaging protocol as previously described. For example, interpreting identified data may include recognizing data that begins with a recognized preamble and ignoring data that lacks a recognized preamble. The monitoring of the parameter of interest may be concluded (block 210) following the interpretation of identified data. Other embodiments may implement continuous monitoring of the parameter of interest.

Figure 9:
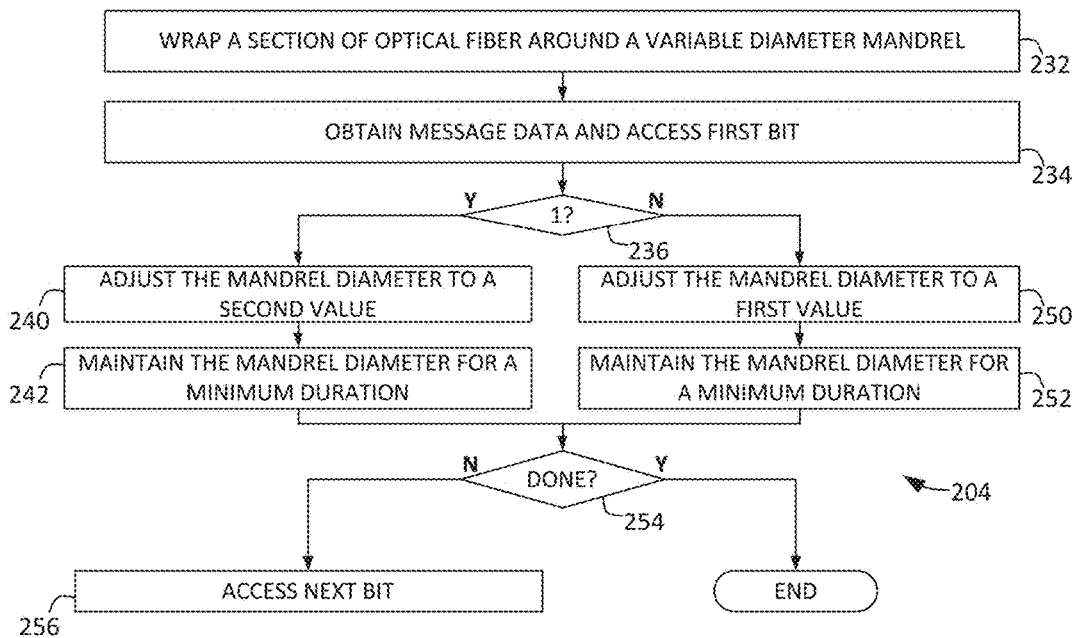
FIG. 9 illustrates detail of a step for manipulating the optical fiber in the flow diagram of FIG. 8.

FIG. 9 illustrates a flow diagram including detail of the optical fiber manipulation operation 204 of the cable management process 200 of FIG. 8. In FIG. 9, the manipulation operation 204 includes wrapping (block 232) a section of the optical fiber around a variable diameter mandrel. A mandrel controller or other resource may access or obtain (block 234) message data including a sequence of binary data points. For each of the data points in the message data, the mandrel controller or other resource may determine (block 236) whether the data point is a binary 1. For binary 1 data points, the illustrated manipulation process 204 adjusts (block 240) the mandrel diameter to a second diameter and maintains (block 242) the mandrel diameter at the second diameter for a minimum duration. For binary 0 data points, the illustrated manipulation process 204 adjusts (block 250) the mandrel diameter to a first diameter and maintains (block 252) the mandrel diameter at the first diameter for the minimum duration. The first and second diameters correspond to an attenuating diameter and a non-attenuating diameter of the mandrel such that the applicable optical fiber signals a binary value in accordance with the mandrel diameter.

After signaling a 1 or 0 associated with a particular data point, the manipulation operation 204 illustrated in FIG. 9 determines (block 254) whether the data message includes additional data points. If so, the illustrated operation accesses (block 256) the next binary data point and returns to operation 236. If operation 254 determines that there are no more messages, the operation completes.

Any one or more processes or methods described above, including processes and methods associated with the FIG. 8 and FIG. 9 flow diagrams, may be embodied as a computer readable storage medium or, more simply, a computer readable medium including processor-executable program instructions, also referred to as program code or software, that, when executed by the processor, cause the processor to perform or otherwise result in the performance of the applicable operations.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. IHSs may include two or more different types of computer readable media and, in such systems, program code may be stored, in whole or in part, in two or more different types of computer readable media.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicate the presence of stated features, operations, elements, and/or components, but does not preclude the presence or addition of one or more other features, operations, elements, components, and/or groups thereof.

What is claimed is:

1. A method comprising:
monitoring a parameter of an optical signal transmitted between two endpoints via an optical fiber;
manipulating the optical fiber to produce a modulation of the parameter; and
identifying data in accordance with the modulation of the parameter;
wherein manipulating the optical fiber comprises modifying a position of at least some portion of the optical fiber, without disconnecting the optical fiber from either of the two endpoints;
wherein the optical fiber includes a wrapped portion comprising a portion of the optical fiber wrapped around a high order mode filter (HOMF);
wherein the optical signal is transmitted from a first endpoint to a second endpoint and wherein the monitored parameter comprises a received power parameter indicative of an average power of the optical signal as received at the second endpoint; and
wherein the HOMF comprises a variable diameter HOMF, wherein manipulating the optical fiber includes varying a diameter of the HOMF between a wrapped diameter and an unwrapped diameter in accordance with a data pattern, wherein the wrapped diameter is less than a threshold diameter and the unwrapped diameter is greater than the threshold diameter.

2. The method of claim 1, wherein a mode volume of the optical fiber is substantially independent of HOMF diameter for HOMF diameters greater than the threshold diameter.

3. The method of claim 1, wherein the received power parameter is substantially independent of HOMF diameter for HOMF diameters greater than the threshold diameter.

4. The method of claim 1, wherein the wrapped portion of the optical fiber includes at least five turns of the HOMF and wherein the received power parameter corresponding to the unwrapped diameter of the HOMF exceeds the received power parameter corresponding to the wrapped diameter by a value in a range of approximately 5% to 10%.

5. The method of claim 4, wherein a ratio of the unwrapped diameter to the wrapped diameter is in a range of approximately 1.1 to 1.5.

6. The method of claim 5, wherein the optical fiber comprises a 62.5 micron multimode fiber core within a 3 mm jacket.

7. The method of claim 1, wherein the data pattern includes a sequence of binary data points and wherein manipulating the optical fiber includes, for each of the binary data points, maintaining the diameter of the HOMF at either the wrapped diameter or the unwrapped diameter for a minimum duration.

8. The method of claim 7, wherein the minimum duration is in a range of approximately 1 to 10 seconds.

9. An information handling system, comprising:
a processor; and
a memory accessible to the processor including program instructions that, when executed by the processor, cause operations including:
monitoring a parameter of an optical signal transmitted between two endpoints via an optical fiber;
modifying a diameter of a mandrel around which a portion of the optical fiber is wrapped to modulate the parameter wherein the mandrel comprises a high order mode filter (HOMF); and
identifying data in accordance with the modulation of the monitored parameter
wherein the optical signal is transmitted from a first endpoint to a second endpoint and wherein the monitored parameter comprises a received power parameter indicative of an average power of the optical signal as received at the second endpoint.

10. The system of claim 9, wherein modifying the diameter comprises decreasing the diameter by approximately 23% and wherein the received power parameter decreases by approximately 5% to 9%.

11. A non-transitory computer readable medium comprising processor executable program instructions that, when executed by the processor, cause operations including:
monitoring a parameter of an optical signal transmitted between two endpoints via an optical fiber;
modifying a diameter of a mandrel around which a portion of the optical fiber is wrapped to modulate the parameter wherein the mandrel comprises a high order mode filter (HOMF); and
identifying data in accordance with the modulation of the monitored parameter;
wherein the optical signal is transmitted from a first endpoint to a second endpoint and wherein the monitored parameter comprises a received power parameter indicative of an average power of the optical signal as received at the second endpoint.

12. The system of claim 11, wherein the diameter comprises decreasing the diameter by approximately 23% and wherein the received power parameter decreases by approximately 5% to 9%.

* * * * *